Oct. 15, 1940.  H. F. PARKER ET AL  2,218,477
MEASURING AND CONTROL APPARATUS
Filed Jan. 16, 1934  3 Sheets-Sheet 1

Humphrey F. Parker
Julius G. Aceves
INVENTORS

BY John J. Rogan
ATTORNEY

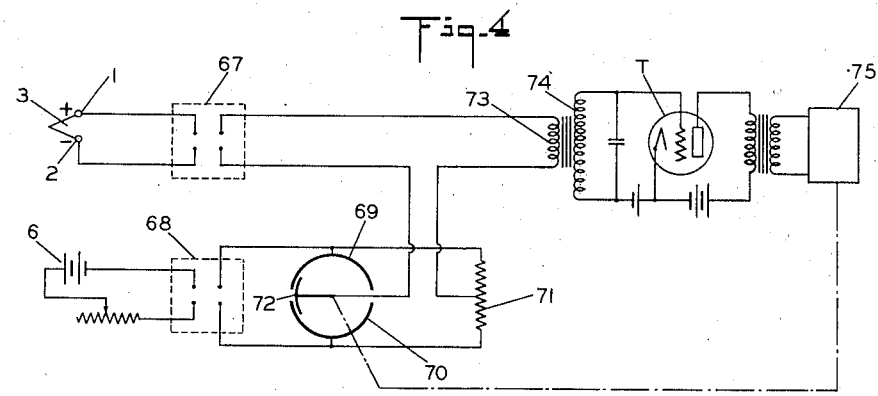
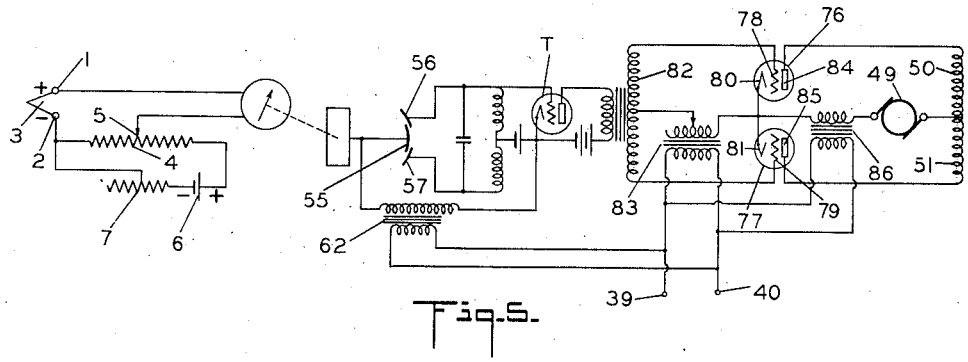
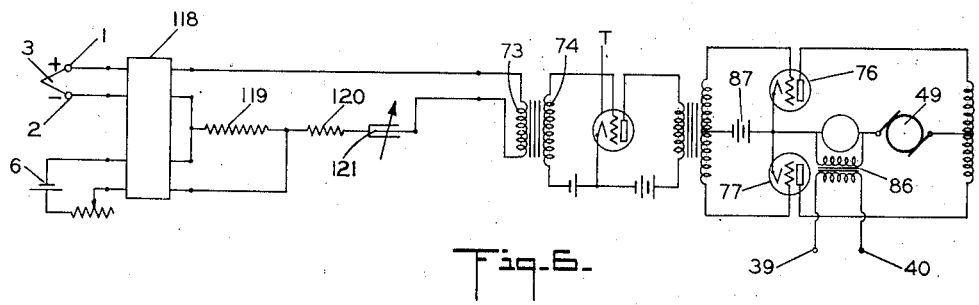

Patented Oct. 15, 1940

2,218,477

UNITED STATES PATENT OFFICE 2,218,477

MEASURING AND CONTROL APPARATUS

Humphrey F. Parker and Julius G. Aceves, New York, N. Y., assignors, by direct and mesne assignments, to Brown Instrument Company, Philadelphia, Pa., a corporation of Pennsylvania Application January 16, 1934, Serial No. 706,832

15 Claims. (Cl. 172—239)

This invention relates to measuring and control systems, and more particularly to systems involving the measurement and/or recording of electric currents or potentials and their utilization for control purposes.

The principal object of the invention is to provide an arrangement for measuring and/or recording potential or current variations of minute magnitude.

Another object is to provide an arrangement for employing current or potential variations of minute magnitude to control the operation of electromechanical devices.

A further object is to provide an arrangement for translating minute D. C. variations into currents of comparatively large amplitude and power, without the necessity of employing a great number of amplifying stages.

A still further object of the invention is to provide a rugged and highly accurate instrument for indicating and/or recording potential or current variations for measurement or control purposes.

A feature of the invention relates to an improved instrument for indicating and/or recording and/or controlling temperature conditions.

Another feature relates to a temperature indicating and/or recording instrument having means in the form of grid-controlled rectifiers for translating the minute control currents into currents of relatively large power.

A still further feature relates to a control system for producing a differential E. M. F. between a source of known magnitude and a source of unknown magnitude, in combination with a grid-controlled rectifier tube for controlling the balancing of the E. M. F.'s from said sources.

A further feature relates to a temperature measuring instrument of the automatic potentiometer type having means for translating thermoelectric E. M. F.'s into alternating currents, and a grid-controlled rectifier upon which the translated currents are impressed for controlling the balance of the potentiometer.

A still further feature relates to an improved control system for an automatic potentiometer type indicating or recording instrument.

Other features and advantages not specifically enumerated will be apparent after a consideration of the following detailed description and the appended claims.

While the invention will be disclosed herein as embodied in specific forms of apparatus, it will be understood that this is done merely for purposes of explanation and not by way of limitation.

In the drawings, Fig. 1 is a schematic diagram showing the invention as embodied in an instrument for measuring temperature variations.

Figs. 2 to 6 are schematic diagrams of modifications of the instrument of Fig. 1;

Figure 1:
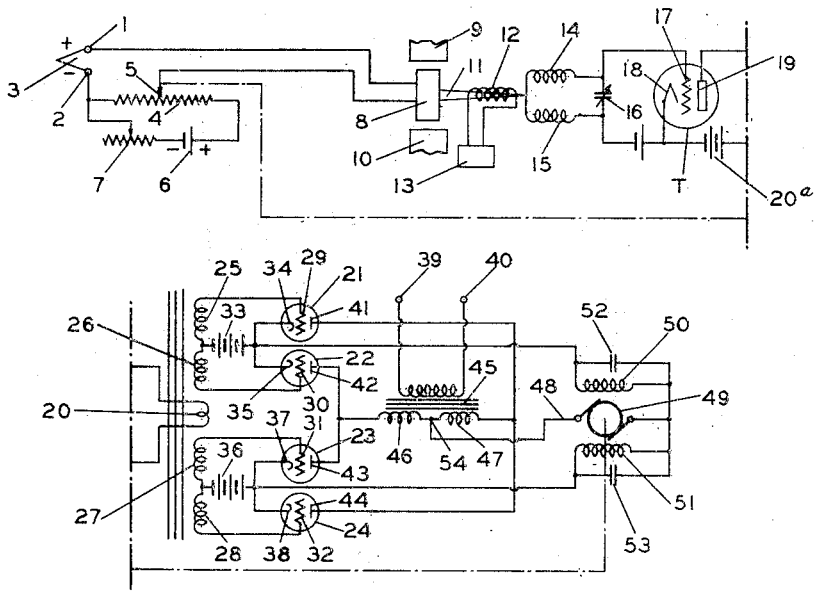

Referring more particularly to Fig. 1, there is shown in schematic form an instrument of the general type disclosed in our copending application Serial No. 667,237 filed April 21, 1933 and issued March 7, 1939 into Patent 2,150,006. This instrument comprises a pair of terminals 1, 2, upon which are impressed the currents or potentials of minute magnitude to be measured. As indicated in the drawings, the terminals 1 and 2 may be connected to a thermo-couple 3 or other similar source of small E. M. F. Associated with the terminal 1 and 2 is a potentiometer comprising the slide wire 4 with its associated adjustable slide wire contact 5. A "primary" or "secondary" standard cell 6 is connected through the current-limiting resistance 7 to the slide wire 4 in known manner. The thermocouple and potentiometer are connected to the moving coil 8 of any well-known form of galvanometer, the magnetic field of which is indicated schematically by the pole pieces 9 and 10. The moving coil 8 is provided with an arm 11 which carries a coil 12, which in turn is connected to a source of alternating current indicated schematically in the drawing by the numeral 13. Positioned in inductive relation to the coil 12 are a pair of coils 14 and 15 which may be, although not necessarily, shunted by a condenser 16. If desired, the source 13 may be of any suitable frequency, either high or low, or even a radio frequency, and the condenser 16 may be variable so as to tune the circuit containing coils 14 and 15 to the frequency of the source 13. This tuned circuit is then connected across the control grid 17 and the cathode 18 of any well-known form of tube amplifier.

The output circuit of the amplifier comprising the anode 19, the transformer primary winding 20 and the potential source 20ª, is coupled to a translating device including two sets of grid-controlled tubes 21, 22, 23, 24. These tubes may be of any well-known type, but are preferably of the gaseous or vapor-filled type, so that a discharge between the anode and cathode occurs only when the grid thereof is within a predetermined potential range. As an example of a tube that may be used for this purpose the "Thyratron" may be mentioned. The transformer is provided with two sets of secondary windings 25, 26, 27, 28. Windings 25 and 26 are connected in series across the control grids 29, 30 of tubes 21, 22, respectively. Similarly, windings 27 and 28 are connected in series across control grids 31, 32 of tubes 23 and 24, respectively. If desired, the windings 25 and 26, instead of being separate windings, may be a single winding provided with a mid-tap, and likewise the windings 27 and 28 may be in the form of a single winding with a mid-tap. The midpoint between the windings 25 and 26 is connected through a biasing source 33 to the cathodes 34 and 35 of tubes 21 and 22, respectively. Similarly, the midpoint between the windings 27 and 28 is connected through a biasing source 36 to the cathodes 37, 38. Preferably, the sources 33 and 36 are designed to bias the associated grids negatively with respect to their associated cathodes in such a manner that a discharge takes place between cathode and anode only for a predetermined instantaneous voltage on the control grids. The duration of the discharge may be controlled by varying the potential induced in the secondary windings with relation to the biasing sources 33 and 36, or by changing the phase of the current in the said secondary windings with relation to the phase of the current from the commercial supply mains 39, 40. While the drawing shows the cathodes of the tubes 21 to 24 schematically, it will be understood that any well-known form of electron-emitting cathode, whether of the thermionic or other type, may be employed. The anodes 41, 42, 43, 44 of the respective tubes 21 to 24 are connected to the alternating current mains 39 and 40 through a transformer 45, which is provided with a center-tapped secondary 46—47, the midpoint of which is connected by conductor 48 through the armature 49 of a suitable reversible motor such as a series wound motor, thence in parallel through its field windings 50, 51, to the cathodes of the tubes 21 to 24. Preferably, the field windings 50, 51 are shunted by condensers 52, 53, respectively, for the purpose of by-passing the alternating components of the current. As will be noted, the portion 46 of the secondary winding impresses a suitable potential upon the anodes 42 and 43, while the portion 47 impresses an equal potential upon the anodes 41 and 44 but reversed in phase. The motor armature 49 is connected through suitable gearing or couplings to the member 5 so that this latter member is adjusted along the slide wire 4 in accordance with the direction and duration of rotation of the armature 49. This direction and duration is controlled by the spatial position of the coil 12 with relation to the coils 14 and 15.

The source 13 should be synchronous with source 39, 40, or preferably the same source should be used for both coil 12 and transformer 45. The phase of the grid voltage across 16, 17 must be substantially the same as that of the E. M. F. across the secondary 46, 47, of 180° displaced.

When the galvanometer member 8 is in its normal or neutral position, the coil 12 is symmetrically disposed with relation to both coils 14 and 15, so that there is no appreciable voltage across winding 20. Should, however, the coil 12 be moved with respect to the coils 14 and 15, a corresponding alternating E. M. F. will be delivered in the output circuit of the amplifier tube, the direction and phase of this E. M. F. being determined by the relative position of coil 12 with respect to coils 14 and 15. Assuming, therefore, that the E. M. F. impressed on the terminals 1 and 2 is of such magnitude as to require the arm 5 to be moved towards the right in order to balance the potentiometer, then the member 8 will be deflected in proportion to the differential voltage between the unbalanced E. M. F. from source 6 and the E. M. F. from source 3. It will be assumed that under these conditions the coil 12 is moved so as to approach the coil 15, producing an alternating current E. M. F. across winding 20. The direction and magnitude of the voltage change in the output circuit of the amplifier tube determines which set of grid-controlled tubes will pass a discharge, and thus selectively control the direction of rotation of the motor. It will be noted that because of the rectifying action of the tubes 21 to 24, the current flowing through the armature 49 is at all times unidirectional, regardless of which set of tubes is conductive. On the other hand, the field windings 50, 51 are selectively energized, depending on which set of the grid-controlled tubes is at the instant conductive. In order that this condition may obtain, it is necessary that the relative polarity of the currents from mains 39 and 40 be properly chosen with respect to the polarity phases of the potentials on the control grids. In other words, with the connections as shown, the portion 46 of the secondary winding is so connected that when the anodes 42 and 43 are positive, then the grid 31 is positive with respect to its associated cathode, while at this time the grid 30 is negative with respect to its associated cathode. On the other hand, the portion 47 is so connected that when the anodes 42 and 43 are positive, the anodes 41 and 44 are negative; but when the current reverses in winding 47, the anodes 41 and 44 become positive at the same time that one of the grids 29 or 32 become positive, thus insuring that at any given instant only one of the windings 50, 51 is energized, while the armature 49 is continuously energized.

As pointed out above, the particular one of the field windings 50, 51 which is energized will depend upon the direction of movement of the coil 12 with respect to the coils 14 and 15, it being understood of course, that the winding 50, for example, controls the rotation of the motor in one direction and the winding 51 controls the rotation in the reverse direction and, as above pointed out, the motor is coupled to the slide wire 5, as indicated schematically by the dot-dash line. As the motor rotates, therefore, the slide wire contact 5 is moved in the proper direction along the wire 4 to balance the potentiometer. As the balancing progresses, the magnitude of the differential current above described which is applied to the moving coil 8, is gradually reduced until finally, when the potentiometer is completely balanced, the coil 12 is restored to its normal or neutral position. Under these circumstances, therefore, the potentials on the grids of the tubes 21 to 24 are such that none of these tubes is conductive, and consequently neither of the windings 50, 51 is energized and the motor and slide wire contact 5 are therefore brought to rest.

In the event that the coil 12 is energized by a high or radio frequency current, it may be necessary to interpose between the amplifier tube and the tubes 21 to 24 a frequency-changing device so as to correlate the frequency impressed on the tubes 21 to 24 with that of the mains 39, 40. This may be accomplished also, for example, by using modulated radio frequency with modulations of the same frequency as the frequency of 39, 40 and demodulating before it reaches winding 20.

Figure 2:
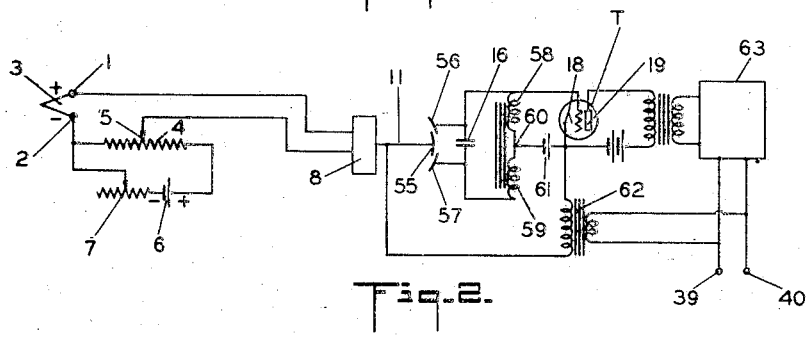

Instead of employing an inductive or electromagnetic coupling between the preamplifier and the galvanometer, an electrostatic arrangement may be employed as disclosed in Fig. 2. In this embodiment the parts corresponding to those of Fig. 1 are designated by the same numerals. However, it is to be noted that the galvanometer arm 11 carries a metallic plate 55, preferably arcuate or segmental in shape. Associated with the movable plate 55 are two correspondingly shaped metal plates 56, 57 which are shunted by the condenser 16. The plates 56 and 57 are connected to the terminals of a balanced inductance arrangement comprising the coil 58 and the coil 59, which are preferably oppositely wound so that the electrical midpoint 60 is at ground potential when the member 55 is in its normal position where it equally overlaps the plates 56 and 57. The input circuit for the preamplifier tube T is connected across the coil 58 through a suitable biasing battery 61. The control voltage should be synchronous and preferably be supplied from the commercial supply mains 39, 40 through a suitable transformer 62 which has one end of its secondary connected to the cathode 18 and the other terminal connected to the plate 55. The rectangle 63 indicates schematically a control device such as indicated in the lower portion of Fig. 1, and includes tubes similar to 21 to 24 of Fig. 1 and the various circuits and motor associated therewith. The manner of functioning of the instrument shown in Fig. 2 is substantially similar to that of Fig. 1; that is to say, when the potentiometer is balanced, the differential current applied to the moving coil 8 is zero and the plate 55 equally overlaps the associated fixed plates 56, 57, as indicated in Fig. 2. Under these conditions neither of the field windings of the motor is energized. Should, however, the potentiometer become unbalanced due to a variation in temperature at the thermal junction 3, the plate 55 is correspondingly moved, resulting in the corresponding selective energization of the proper motor field winding, as described above in connection with Fig. 1.

Figure 3:
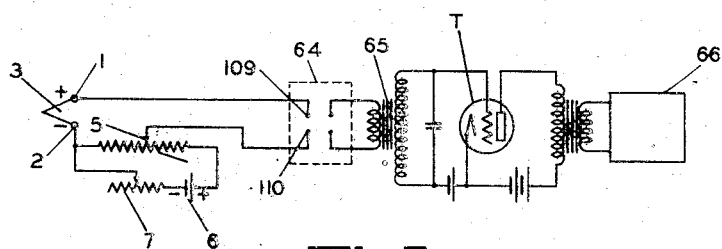

Instead of coupling the potentiometer to the preamplifier tube and the galvanometer control device, as shown in Figs. 1 and 2, the differential current from the potentiometer may be converted into an alternating current by means of a suitable converter indicated schematically by the rectangle 64 (Fig. 3). For a detailed description of one form of converter, reference is made to copending application Serial No. 667,237, now issued into Patent 2,150,006 and referred to above. These converted alternating currents are impressed upon the preamplifier tube T by the coupling transformer 65 and thence upon a motor and control mechanism 66, similar to that disclosed in the lower portion of Fig. 1. The manner of functioning of the instrument is substantially similar to that of Figs. 1 and 2. If the potentiometer is unbalanced, there will be generated an E. M. F. corresponding in phase and magnitude to the differential current from the potentiometer. The motor therefore is selectively energized and acts to rebalance the potentiometer until the differential current is reduced to zero or some predetermined magnitude at which the motor fields may become deenergized.

Figure 8:
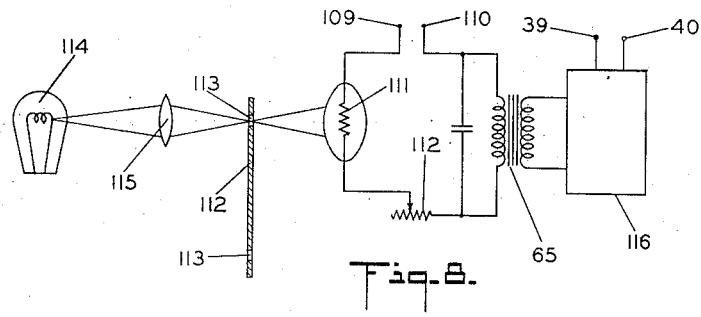
Figs. 8 and 9 are schematic diagrams of a modified form of converter that may be used in the instruments of Figs. 1 to 7, inclusive.
Figure 9:
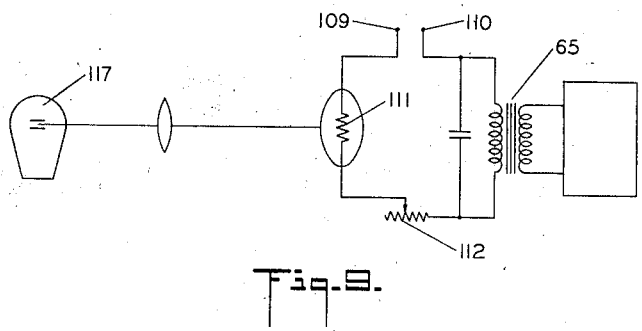

While Figs. 1 to 3 show an instrument employing a potentiometer of the slide wire resistance type, it will be understood that the invention is not limited thereto, but that a balancing system such as disclosed in Fig. 4 may be employed. In this figure the minute unidirectional E. M. F.'s from the thermal response element 3 are converted into corresponding alternating currents by means of a converter 67. Likewise the current from the "primary" or "secondary" standard source 6 is converted by converter 68 into alternating current of the same frequency and phase as the current from the converter 67. Converters 67 and 68 may be similar to converter 64 of Fig. 3 or may take the form of converters such as shown in Figs. 8 and 9 of the drawing herein. The output of the converter 68 is connected across a path of arcuate metal plates 69, 70 and also across a high resistance 71. Associated with the plates 69 and 70 is a rotatable metal plate 72 which is coupled to the motor shaft, as indicated schematically by the dot-dash line. The output of the converter 67 is connected through the transformer primary 73 to the electrical midpoint of the resistance 71 and to the plate 72. The secondary 74 of this transformer is connected across the grid and cathode of the preamplifier tube T which in turn feeds into a control device 75 similar to that disclosed in the lower portion of Fig. 1. The manner of functioning of the instrument of Fig. 4 is similar to that of the preceding figures; that is to say, when the movable plate 72 overlaps equally the plates 69 and 70, the converted current derived from the standard source 6 is balanced with the converted current from the source 3 and there is substantially a zero differential current applied to the winding 73.

It will be understood, of course, that the member 72 carries a suitable indicator or the like and associated with this indicator is a scale or recording mechanism calibrated in the proper temperature units. Should the temperature vary from the normal or zero or base temperature, there will be produced a differential current in the winding 73, resulting in a selective rotation of the motor in the manner described above in connection with Figs. 1 to 3. The motor therefore rotates the plate 72 until the differential current between the converters 67 and 68 is reduced to zero or some other predetermined base value.

Referring to Fig. 5, there is shown an instrument similar to that of Fig. 2 with the exception that the control mechanism indicated by the rectangle 63 of Fig. 2 is somewhat modified. In this figure the parts corresponding to those of Fig. 2 are designated by the same numerals. The motor armature 49 and the field windings 50, 51 are controlled by only two discharge tubes, i. e., tubes 76, 77. These tubes are preferably of the grid-controlled type having a filling of gas or vapor and become conductive between the anode and cathode only for a predetermined potential range on their grids 78, 79. The E. M. F. from the output of the preamplifier tube T is impressed across the grids 78 and 79 of these discharge tubes, the cathodes 80 and 81 being connected through a biasing source to the electrical midpoint of the secondary winding 82 of a suitable coupling transformer. The biasing potential for the grids 78 and 79 may be derived from the mains 39, 40, through a suitable step-down transformer 83.

Likewise, the potential for the anodes 84, 85 may be derived from the same mains by means of the transformer 86 which is connected in circuit with the armature 49 and the field windings 50, 51, as shown. The mains 39, 40 likewise supply control current through transformer 62 to the movable member 55 in the manner described above in connection with Fig. 2. Depending upon the polarity phase of the current in winding 82, one or the other of the tubes 76, 77 is conductive and consequently one or the other of the motor field windings 50, 51 is energized. The duration of this energization will be until the plate 55 is restored to its normal position; in other words, when the differential current from the potentiometer is reduced to zero. It will be understood, of course, that the current supplied by the transformer to the anodes of the tubes passes through its positive polarity phase coincident with the positive phase of the associated grids 78 and 79.

The manner of functioning of the instrument of Fig. 5 will be clear from the description given above in connection with Figs. 1 to 4.

Fig. 6 shows an instrument employing a converter 118 by means of which the D. C. potential applied to terminals 1 and 2, and the D. C. potential from the standard source 6 are each converted into corresponding alternating potentials. The alternating potential from source 6 is impressed upon the potentiometer resistance 119. The alternating potential derived from source 3 is also applied across the resistance 119 through the series resistance 120 and adjustable condenser 121, and the primary winding 73. The secondary winding 74 is connected to the amplifier T. The output of the amplifier T is impressed by means of a suitable coupling transformer upon a pair of grid-controlled tubes 76, 77, these tubes being preferably similar to the corresponding tubes on Fig. 5, that is to say, they are preferably tubes having a filling of an ionizable medium the discharge current through which is controlled by the potentials on the control grids. The motor 49 is coupled by suitable means (not shown) to the variable element of the condenser 121. Since, however, the currents or potentials applied to the potentiometer wire 119 are themselves alternating, it is not necessary to connect the terminals 39, 40 to the potentiometer. Preferably, however, the converter 118 is so designed as to produce the same frequency as is derived from the terminals 39, 40. Instead of biasing the grids of tubes 76, 77, by an alternating potential, as in Fig. 5, a steady biasing potential 87 may be employed. When the potentiometer is in balance, that is to say, when there is substantially zero differential between the alternating potential from source 3 and source 6, there is a predetermined potential difference across the grids of tubes 76, 77. This difference, however, is insufficient to initiate a discharge through either of the tubes and thus the motor 49 remains stationary. Should, however, the potentiometer become unbalanced, this potential difference is charged causing either one of the tubes 76, 77 to become conductive in the manner described above in connection with Figs. 1 to 5. The motor 49 therefore rotates in the proper direction and varies the capacity of the condenser 121 until balance is again achieved whereupon the motor becomes stationary and the instrument indicates the temperature in the selected units.

Figure 7:
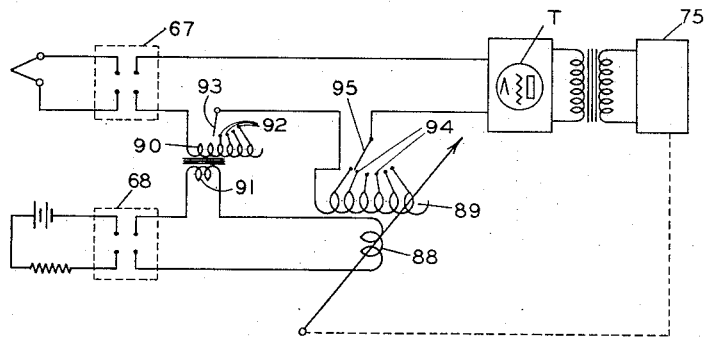
Fig. 7 is a schematic diagram of a modified form of circuit that may be used in the instruments of Figs. 1 to 6.

Fig. 7 shows a further modification of the potentiometric balancing arrangement. In general, the arrangement of Fig. 7 is similar to that of Fig. 4, and corresponding parts in the two figures are designated by the same numerals. In Fig. 7, however, the balance of potentials is achieved by a variable inductance comprising a coil 88 which is inductively related to another coil 89. One of these coils, for example, coil 88 is coupled as indicated by the dotted line to the motor in the motor-control unit 75. This motor and motor-control unit 75 may be similar to that of Fig. 1 or Fig. 5 or Fig. 6. If desired, the coils 88 and 89 may form a wellknown variometer such as is ordinarily employed in radio tuning circuits. The alternating current from converter 67 is applied to coil 89 through a transformer winding 90, while the alternating current from converter 68 is applied to the transformer winding 91. When the potentiometer is in balance, the potentials induced in the winding 90 from the winding 91 and in the winding 89 from the winding 88 are equal and opposite to the potentials impressed thereon from the converter 67, so that the potentials impressed upon the grids of the motor-control tubes in the control unit 75, are insufficient to cause a discharge through either one of these tubes. On the other hand, when the potentials are out of balance, there is produced in the output circuit of tube T, an amplified differential potential which is sufficient to render the proper tube or the proper pair of tubes, in the unit 75 conductive. The motor therefore rotates in the proper direction and causes the coil 88 to vary its inductive position with relation to the coil 89 until the differential voltage is again reduced to the point where the motor-control tubes are nonconductive.

As it will be noted from Fig. 7, the variometer winding 89 is provided with a series of taps 94 and an adjustable switch arm 95 for extending the working range of the instrument. For example, when the switch arm 95 is on the first tap contact, the instrument will record or indicate open scale, that is to say, for a given range of temperature a greater extent of movement of the coil 88 is produced. If a larger range of temperature is to be indicated or recorded, the switch arm 95 is moved to the proper one of the variometer taps. There is thus provided a means for varying the degree of "open scale" indications or recordings of the instrument.

It will also be noted from Fig. 7, that the transformer winding 90 is provided with a series of taps 92 and an adjustable switch arm 93. The purpose of this is to provide open scale readings over a series of small temperature ranges each of which covers only a portion of the total range of the instrument. For example, a temperature change of say 100 degrees at the thermocouple may create an E. M. F. which requires the maximum movement of the variometer 88, 89 for balancing. In this case coil 90 is provided with taps so spaced that movement of the arm 93 from one tap to the next will cause a change of mutual inductance sufficient to balance the E. M. F. due to 100 degrees of temperature change at the thermocouple.

In some instances it may be desirable to vary the sensitivity of the readings either when the instrument is operating over its full-scale range or over a selected open-scale range. This is controlled by varying the effective number of turns of coil 89 in circuit. One manner of accomplishing this is by providing coil 89 with a series of taps 94 adapted to be connected in circuit through an adjustable switch arm 95. Thus the switch 93 controls the particular range over which the instrument is desired to operate, while switch 95 controls the extent of movement of the indicator or recorder arm, that is the sensitivity of the instrument.

Referring to Fig. 8, there is shown a modified form of converter that may be used in place of the converters 64, 67, 68 of Figs. 3 and 4. In Fig. 8, for example, the terminals 109, 110 correspond to the terminals 109, 110 of Fig. 3. The terminal 109 is connected through a light-sensitive photoconductive cell 111 which has the property of varying its resistance in accordance with the intensity of light impinging thereon. Connected in circuit with the cell 111 is a variable resistance 112 and the primary winding of the coupling transformer 65. Positioned in front of the cell 111 is a rotatable disc 112 having a series of perforations 113 therein arranged preferably at equal radial distance on the axis of the disc rotation. In optical alignment with the cell 111 is a steady source of light 114, the light from which is projected by a suitable optical system 115 through the perforations 113 onto the cell 111. The perforations 113 are designed and arranged so that when the disc 112 rotates, cyclical light variations are effected. The disc 112 is rotated at the required speed so as to interrupt the light at the desired frequency corresponding to the frequency of the source which supplies the grid control rectifier; that is to say, at the frequency of the current supplied by the mains 39 and 40. In this figure the rectangle 116 is intended to represent schematically a motor and motor control device similar to that of Fig. 1, Fig. 5 or Fig. 6.

Instead of employing a steady light 114 and a light shutter or modulator 112, the light sensitive cell may be exposed to a varying light in the manner indicated in Fig. 9, wherein the source 117 may be in the form of a neon or gaseous discharge lamp having an inherent light variation characteristics, or such a lamp energized with an alternating voltage of the desired frequency. In other respects the converter of Fig. 9 is similar to that of Fig. 8 and further description thereof is believed unnecessary.

Subject matter disclosed in this application but not claimed therein is being claimed in our co-pending application, Serial No. 290,352, filed August 16, 1939.

Various changes and modifications may be made herein without departing from the spirit and scope of the invention. For example, instead of employing a circumferentially perforated opaque disc, a disc having regularly recurrent opacity variations around its edge may be employed. For example, these opacity variations may be in the form of radial striations each striation having a predetermined opacity range e. g. in the nature of "light wedge," or the striations employed in "talking movie" films. Instead of employing "variable density" striations so-called "variable area" opacities may be employed.

Subject matter disclosed but not claimed in this application is being claimed in our divisional applications Serial No. 234,376, filed October 11, 1938 and Serial No. 290,352, filed August 16, 1939.

What we claim is:

1. In combination, a source of direct E. M. F. of known magnitude, a source of direct E. M. F. of unknown magnitude, means for converting said direct E. M. F.'s into pulsating E. M. F.'s, means comprising a potentiometer for opposing said converted E. M. F.'s said potentiometer including a variable condenser through which the potentiometer currents flow, means for amplifying the unbalanced portions of the said E. M. F.'s, a reversible motor, and means for selectively controlling the direction and duration of rotation of said motor under control of said amplified E. M. F.'s, the last-mentioned means including a plurality of pairs of grid-controlled gaseous discharge tubes with the input circuit for one pair of tubes connected in opposed balancing relation with the input circuit of the other pair of tubes.

2. An instrument for measuring direct current comprising means for converting direct current into pulsating current, a potentiometric balancing mechanism of the variable electrostatic type including a variable condenser through which the potentiometer currents flow, a pair of grid-controlled gaseous discharge tubes having their input and output circuits connected in opposed balancing relation and controlled by the unbalanced potentiometric E. M. F. and a motor controlled by the output circuits of said tubes for controlling the potentiometer balance.

3. An instrument for measuring direct current comprising means for converting direct current into pulsating current, a potentiometer, means including a coupling coil movable to effect a balancing of the potentiometer, a pair of grid-controlled gaseous discharge tubes having their input and output circuits connected in opposed balancing relation with the input circuits coupled to said coil, and a motor for moving said coil, said motor being controlled by the output circuits of said tubes.

4. A potentiometer for measuring direct current comprising a source of E. M. F. of unknown magnitude, a source of E. M. F. of known magnitude, means for converting direct current resulting from said E. M. F.'s into a pulsating current, a potentiometer having movable electric inductor members energized by said converted current, adjusting means including said inductor members for opposing said known E. M. F. to said unknown E. M. F. and a balance-control winding for the unbalanced portion of said opposing E. M. F.'s.

5. In combination, means for opposing a source of E. M. F. of known magnitude against a source of E. M. F. of unknown magnitude to derive a differential E. M. F., said opposing means including a pair of mechanically independent relatively movable devices coupling said E. M. F.'s, an amplifier having an input circuit connected to amplify said differential E. M. F. and an output circuit, and a motor controlled by the output current of said amplifier for operating said devices to reduce said differential E. M. F.

6. A self balancing measuring system including a source of known E. M. F. and a network connecting an unknown E. M. F. to be measured to oppose said E. M. F., an amplifier the input of which is connected to said network rendering said amplifier responsive to the difference of said E. M. F.'s, and capacitative means connected to and controlled by the output of said amplifier and adapted to rebalance said E. M. F.'s when unbalanced.

7. A self balancing measuring system including a source of known E. M. F. and a network connecting an unknown E. M. F. to be measured to oppose said E. M. F., an ampliper the input of which is connected to said network rendering said amplifier responsive to the difference of said E. M. F.'s, and inductive means connected to and controlled by the output of said amplifier and adapted to rebalance said E. M. F.'s when unbalanced.

8. Means for comparing a direct current E. M. F. of unknown magnitude with a direct current E. M. F. of known magnitude including means for converting each of said E. M. F.'s into pulsating E. M. F.'s, a bridge network having at least one arm the impedance of which is variable, circuit means for impressing the pulsating E. M. F. derived from said known direct current E. M. F. across one pair of opposed terminals of said bridge network, means for opposing the pulsating E. M. F. derived from the said unknown E. M. F. to a pulsating E. M. F. produced across the other pair of opposed terminals of said bridge network as a result of bridge network unbalance, means for amplifying the differential between said opposed E. M. F.'s, and means under control of said amplified E. M. F. adapted to vary said variable bridge network impedance to reduce said differential E. M. F.

9. Means for comparing a direct current E. M. F. of unknown magnitude with a direct current E. M. F. of known magnitude including means for converting each of said E. M. F.'s into pulsating E. M. F.'s, a bridge network having at least one arm the impedance of which is variable, circuit means for impressing the pulsating E. M. F. derived from said known direct current E. M. F. on one pair of opposed terminals of said bridge network, a transformer having a primary winding and a secondary winding, means including said transformer primary winding for impressing the pulsating E. M. F. derived from said unknown direct current E. M. F. on the other pair of opposed terminals of said bridge network, an electronic valve having an input circuit and an output circuit, a connection between said transformer secondary winding and the input circuit of said valve, and means controlled by the output circuit of said valve adapted to vary said bridge network impedance to reduce the current flow through said transformer primary winding.

10. Means for comparing a direct current E. M. F. of unknown magnitude with a direct current E. M. F. of known magnitude including means for converting each of said E. M. F.'s into pulsating E. M. F.'s, a bridge network including fixed resistances in two opposed arms and variable capacitances in the remaining opposed arms, circuit means for impressing the pulsating E. M. F. derived from said known E. M. F. on one pair of opposed terminals of said bridge network, a transformer having a primary winding and a secondary winding, means including said transformer primary winding for impressing the pulsating E. M. F. derived from said unknown direct current E. M. F. on the other pair of opposed terminals of said bridge network, an electronic valve having an input circuit and an output circuit, a connection between said transformer secondary winding and the input circuit of said valve, and means controlled by the output circuit of said valve adapted to vary the relative values of said bridge network capacitative arms to reduce the current flow through said transformer primary winding.

11. The method of measuring a unidirectional E. M. F. of minute magnitude having a very low frequency component and difficult of direct amplification which comprises the steps of translating said E. M. F. into a current of readily amplifiable frequency, independently translating a unidirectional E. M. F. of known magnitude into a current of the same frequency, opposing said currents, amplifying the resultant of said currents, and applying said amplified current directly to effect a balance between said opposed currents.

12. Means for comparing a direct current E. M. F. of unknown magnitude with a direct current E. M. F. of known magnitude including means for converting each of said E. M. F.'s into pulsating E. M. F.'s, means for opposing said pulsating E. M. F.'s, said last mentioned means including variable capacitative coupling means, and means under control of the differential between said opposed E. M. F.'s adapted to vary the coupling between said opposed pulsating E. M. F.'s to reduce said differential E. M. F.

13. Means for comparing a direct current E. M. F. of unknown magnitude with a direct current E. M. F. of known magnitude including means for converting each of said E. M. F.'s into pulsating E. M. F.'s, means for opposing said pulsating E. M. F.'s, said last mentioned means including variable inductive coupling means, and means under control of the differential between said opposed E. M. F.'s, adapted to vary the coupling between said opposed pulsating E. M. F.'s to reduce said differential E. M. F.

14. Means for comparing a direct current E. M. F. of unknown magnitude with a direct current E. M. F. of known magnitude including means for converting each or said E. M. F.'s into pulsating E. M. F.'s, a fixed resistor, circuit means for impressing the pulsating E. M. F. derived from said known E. M. F. on said fixed resistor, a second fixed resistor, a variable condenser, circuit means for impressing the pulsating E. M. F. derived from said unknown E. M. F. on said first mentioned resistor through said second mentioned resistor and said condenser in opposition to the said pulsating E. M. F. derived from said known E. M. F., means for amplifying the differential E. M. F. between said opposed pulsating E. M. F.'s, and means under control of said amplified E. M. F. adapted to vary said condenser to reduce said differential E. M. F.

15. An instrument for comparing a fluctuating E. M. F. of unknown magnitude with a fluctuating E. M. F. of known magnitude, circuit means for opposing said fluctuating E. M. F.'s including a coupling transformer having a primary and a secondary winding the positions of which are fixed relatively to each other, a coupling transformer having a primary and a secondary winding the positions of which are relatively adjustable, means for varying the ratio of primary to secondary turns on said first mentioned transformer for adjusting the operating range of the instrument, means for varying the ratio of primary to secondary turns on said second mentioned transformer for adjusting the sensitivity of the instrument, and means under control of the differential between said fluctuating E. M. F.'s adapted to control the relative positions of the primary and secondary windings of said second mentioned transformer for maintaining said differential E. M. F. at a minimum value.

HUMPHREY F. PARKER.
JULIUS G. ACEVES.